United States Patent
Abotaleb et al.

(10) Patent No.: US 12,109,531 B2
(45) Date of Patent: Oct. 8, 2024

(54) PROCESS FOR HYBRID CARBON CAPTURE AND MINERALIZATION

(71) Applicant: Qatar Foundation for Education, Science and Community Development, Doha (QA)

(72) Inventors: Ahmed Abotaleb, Doha (QA); Alessandro Sinopoli, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 457 days.

(21) Appl. No.: 17/504,699

(22) Filed: Oct. 19, 2021

(65) Prior Publication Data
US 2022/0134282 A1    May 5, 2022

Related U.S. Application Data

(60) Provisional application No. 63/093,877, filed on Oct. 20, 2020.

(51) Int. Cl.
*B01D 53/79* (2006.01)
*B01D 53/62* (2006.01)
(Continued)

(52) U.S. Cl.
CPC ............ *B01D 53/79* (2013.01); *B01D 53/62* (2013.01); *B01D 53/78* (2013.01); *C01D 7/16* (2013.01);
(Continued)

(58) Field of Classification Search
CPC ........ B01D 53/79; B01D 53/62; B01D 53/78; B01D 2251/80; B01D 2257/504;
(Continued)

(56) References Cited

U.S. PATENT DOCUMENTS 10,118,843 B2 * 11/2018 El-Naas ................. C01D 7/00
10,203,434 B2 *  2/2019 Constantz ............. E04D 7/005
(Continued)

FOREIGN PATENT DOCUMENTS

CN        103521056 A    1/2014
CN        105523571 A    3/2018

OTHER PUBLICATIONS

Arenas, et al; "CO2 capture via barium carbonate formation after its absorption with ammonia in a pilot scale column"; Chemical Engineering Journal; 2014, 254, 220-229 (10 pages).
(Continued)

*Primary Examiner* — Stephen Hobson
(74) *Attorney, Agent, or Firm* — K&L Gates LLP (57) ABSTRACT

The principal approaches to reducing the effects of global warming seek to slow the increase in atmospheric CO2 levels as a result of fossil fuel combustion for energy production and transportation. A process for hybrid carbon capture and mineralization are disclosed. The process utilizes both flue gas from (e.g., power plants) and reject brine from (e.g., desalination process). The process includes providing flue gas to react with an amine solution to produce carbamate; processing the carbamate in a reactor to regenerate amine and to produce a carbonate; treating reject brine to provide a ready-made brine for carbonation reaction; and processing the carbamate with salt from treating the brine to produce a carbonate.

9 Claims, 11 Drawing Sheets
(2 of 11 Drawing Sheet(s) Filed in Color)

(51) Int. Cl.
*B01D 53/78* (2006.01)
*C01D 7/16* (2006.01)
*C01D 7/22* (2006.01)

(52) U.S. Cl.
CPC ............ *C01D 7/22* (2013.01); *B01D 2251/80* (2013.01); *B01D 2257/504* (2013.01); *B01D 2258/0283* (2013.01)

(58) Field of Classification Search
CPC .. B01D 2258/0283; B01D 2252/20421; B01D 2252/20426; B01D 2252/20431; B01D 53/1425; B01D 53/1475; B01D 53/96; B01D 2252/20447; C01D 7/16; C01D 7/22; C01F 5/24; C01F 11/181; C01P 2002/72; C01P 2002/82; Y02C 20/40; Y02P 20/151
See application file for complete search history.

(56) References Cited

U.S. PATENT DOCUMENTS

| | | | | |
|---|---|---|---|---|
| 2010/0011956 | A1* | 1/2010 | Neumann | C10L 3/102 |
| | | | | 261/23.1 |
| 2010/0092368 | A1* | 4/2010 | Neumann | B01D 53/62 |
| | | | | 423/437.1 |
| 2012/0153223 | A1* | 6/2012 | Jeong | B01D 53/1475 |
| | | | | 252/184 |
| 2013/0108532 | A1* | 5/2013 | Idem | B01D 53/1425 |
| | | | | 423/220 |
| 2017/0274318 | A1* | 9/2017 | Constantz | B01D 53/1425 |
| 2017/0341942 | A1* | 11/2017 | Harper, Jr. | F01K 7/16 |
| 2017/0348631 | A1* | 12/2017 | Li | B01D 53/62 |
| 2018/0280869 | A1* | 10/2018 | Constantz | C02F 9/20 |
| 2024/0198280 | A1* | 6/2024 | Behr | B01D 53/1493 |

OTHER PUBLICATIONS

Vinoba, et al.; "Harvesting CaCO3 polymorphs from in situ CO2 capture process"; The Journal of Physical Chemistry, 2014, 118, 17556-17566; (11 pages).

Vinoba, et al.; supporting information for "Harvesting CaCO3 polymorphs from in situ CO2 capture process"; The Journal of Physical Chemistry, 2014, 118, 17556-17566; (14 pages).

Yu, et al.; "A Diamine-Based Integrated Absorption-Mineralization Process for Carbon Capture and Sequestration: Energy Savings, Fast Kinetics, and High Stability"; Environ. Sci.Techno. 2018, 52, 13629-13637; (9 pages).

Yu, et al.; Supporting information for "A Diamine-Based Integrated Absorption-Mineralization Process for Carbon Capture and Sequestration: Energy Savings, Fast Kinetics, and High Stability"; Environ. Sci. Techno. 2018, 52, 13629-13637; (7 pages).

Ji, et al; "Integrated absorption-mineralisation for low-energy CO2 capture and sequestration"; Applies Energy, 2018, 225, 356-366; (11 pages).

Yu, et al; "Characterisation and kinetic study of carbon dioxide absorption by an aqueous diamine solution"; Applied Energy, 2017, 208, 1308-1317; (10 pages).

Lu, et al.; "Renewable energy storage via efficient reversible hydrogenation of piperidine captured CO2"; Green Chemistry, 2018, 20, 4292-4298; (7 pages).

Lu, et al.; Supporting information for "Renewable energy storage via efficient reversible hydrogenation of piperidine captured CO2"; Green Chemistry, 2018, 20, 4292-4298; (14 pages).

* cited by examiner

"ATR-FT-IR spectral collection of conservation materials in the extended region of 4000-80 cm$^{-1}$"
*Analytical and Bioanalytical Chemistry*, 2016, *408* (13), pp 3373–3379.

"ATR-FT-IR spectral collection of conservation materials in the extended region of 4000-80 cm⁻¹" *Analytical and Bioanalytical Chemistry, 2016, 408 (13), pp 3373–3379.*

Figure 9

"ATR-FT-IR spectral collection of conservation materials in the extended region of 4000-80 cm⁻¹"
*Analytical and Bioanalytical Chemistry, 2016, 408 (13), pp 3373–3379.*

PROCESS FOR HYBRID CARBON CAPTURE AND MINERALIZATION

PRIORITY CLAIM

The present application claims priority to and the benefit of U.S. Provisional Application 63/093,877, filed Oct. 20, 2020, the entirety of which is herein incorporated by reference.

BACKGROUND

Carbon dioxide ($CO_2$) considered as one of the main contributor to the greenhouse gases (GHGs and it has a negative effect on the environment. In industry scale, $CO_2$ is released to the environment as an exhaust stream from different sources including combustion reactions, incineration (flue gas), reformer, etc. Recently, there is a lot of pressure to capture $CO_2$ waste stream and either store it or convert it to valuable products (carbon capture, sequestration and utilization). On the other hand, demand on fresh water is steadily increasing due to the rapid growth of population. Therefore, water desalination plants is steadily increasing as a reliable technology to produce fresh water in large scale. Reject brine is the waste stream from desalination plants and there are different disposal methods, where surface water discharge (SWD) is mostly used. SWD has a negative environment effect on the marine life in addition to being costly process (e.g., $0.05/m^3$: $0.30/m^3$ of brine rejected).

Carbon capture and mineralization has been a challenge. Carbon dioxide absorption in water is a slow reaction with extremely slow kinetics. Such conditions requires a relatively big reactor volume, which in turn will require a high capex or normal reactor size, but with a high residence time resulting in a negative affect on productivity.

SUMMARY

The present disclosure relates generally to a process for hybrid carbon capture and mineralization. According to an embodiment, the process utilizes two waste streams 1) flue gas from, for example, power plants and 2) reject brine from, for example, desalination plants for mineralization process to produce carbonates including $CaCO_3$, $MgCO_3$, $Na_2CO_3$, $BaCO_3$, and the like. By using this process, the flue gas is treated instead of flaring to the environment, reject brine is utilized rather than being disposed back to environment, and most importantly, valuable products (carbonates) used in building rocks, concrete, cement, and other suitable applications are produced.

Applicant surprisingly found that to overcome the slow reaction kinetics of carbon dioxide capture, an amine solution for absorbing $CO_2$ is selected to ensure high and fast $CO_2$ absorption.

In a first non-limiting aspect of the present disclosure, a process for hybrid carbon capture and mineralization is provided. The process includes providing any streaming source of $CO_2$ to react with an amine solution to produce carbamate; directing the carbamate to a reactor to regenerate amine and to produce carbonates; treating reject brine to make ready the brine for carbonation reaction; and the carbamate reacting with salt from the brine to produce carbonates.

In a further aspect, such streaming sources include, but are not limited to, flue gas from power plants, waste gases from incinerators, waste stream from reformers (methanol, urea, etc.), and waste gases from combustion reactions.

In another aspect, the process for hybrid carbon capture and mineralization can capture carbon from any brine source stream. The brine source streams include, but are not limited to, reject brine from desalination plants, seawater stream, produced water from oil & gas plants, wastewater from GTL plants, alkaline waste, saline groundwater; brackish water.

In an embodiment, the resulting products of the process for hybrid carbon capture and mineralization are carbonates. The process works for a non-limiting variety of elements such as all of group #2 (Ca, Mg, Ba, Be, Sr, and Ra). Further, the process works for all of group #1 (Li, Na, K, Rb, Cs, and Fr), however, the addition of an entrainer is required to alter the pH to avoid the relatively high solubility of group #1 in water. Finally, the process works for some transition metals including, but not limited to, Pb, Fe, Cu, and Cd.

In another embodiment, potential amines include, but are not limited to, primary amines (MEA, DGA), secondary amine (DEA, DIPA), tertiary amine (MDEA, TEA), amino acids, aromatic amines (aniline, etc.), cyclic aromatic amines (pyridine, piperazine, pyrimidine, triazole, tetrazole, pirrole, imidazole, etc.), cyclic amines (Piperidine, pirrolidine, etc.), sterically hindered amines (PZ, AMP, DETA, AEEA, MAPA, DETA, TETA, TEPA), PZ derivatives (1-MPZ, 1-EPZ, DMPZ, HEP, TEDA), immobilized amines on metal oxides (Ti, Ni, Si, Zn, Zr, etc.), metal oxides, binary and ternary metal oxides, physical solvents ($K_2CO_3$, etc.), ionic liquids, deep eutectic solvents, blended amines (bi-blend, tri-blend and tetra-blend), ammonia, and alkali.

An advantage of one or more embodiments provided by the present disclosure is that the process for hybrid carbon capture and mineralization can succeed through the use of amine solution with a neutral pH. Similar processes require alkaline media to precipitate carbonates and use of alkaline media such as NaOH, CaO, $Ca(OH)_2$, MgO, $Mg(OH)_2$ significantly increase the relative cost of the process and negatively impact any return on investment from carbon capture and mineralization. The use of an amine solution produces carbamate and, with the addition of brine, a carbonate precipitates. Then, the amine is "chemically regenerated" and can be reused for more process for hybrid carbon capture and mineralization.

A further advantage of one or more embodiments provided by the present disclosure is that the process for hybrid carbon capture and mineralization results in a fast reaction time and increased kinetics for $CO_2$ absorption.

A further advantage of one or more embodiments provided by the present disclosure is that the process for hybrid carbon capture and mineralization does not use an alkaline source for the precipitation process.

A further advantage of one or more embodiments provided by the present disclosure is that the process for hybrid carbon capture and mineralization precipitates carbonate at neutral pH.

A further advantage of one or more embodiments provided by the present disclosure is that the process for hybrid carbon capture and mineralization chemically regenerates the reusable amine solution.

A further advantage of one or more embodiments provided by the present disclosure is that the process for hybrid carbon capture and mineralization eliminates any thermal energy requirements for amine solvent regeneration.

A further advantage of one or more embodiments provided by the present disclosure is that the process for hybrid carbon capture and mineralization eliminates the need for a stripper column in the $CO_2$ capture process, meaning there is a lower capex and shorter payback period.

A further advantage of one or more embodiments provided by the present disclosure is that the process for hybrid carbon capture and mineralization reduces and/or eliminates the stripper column high corrosion rate at the bottom section where the carbon dioxide was in relatively higher concentration and the temperature (average of 125° C.).

A further advantage of one or more embodiments provided by the present disclosure is that the process for hybrid carbon capture and mineralization eliminates the need for anti-corrosion technology in $CO_2$ capture plant.

A further advantage of one or more embodiments provided by the present disclosure is that the process for hybrid carbon capture and mineralization ensures a relatively high $CO_2$ loading capacity.

A further advantage of one or more embodiments provided by the present disclosure is that the process for hybrid carbon capture and mineralization works at nearly room temperature conditions (atmospheric pressure and room temperature).

Additional features and advantages are described herein, and will be apparent from the following Detailed Description and the figures.

BRIEF DESCRIPTION OF THE FIGURES

The patent or application file contains at least one drawing executed in color. Copies of this patent or patent application publication with color drawing(s) will be provided by the office upon request and payment of the necessary fee.

DETAILED DESCRIPTION

The present disclosure provides a process for hybrid carbon capture and mineralization. The process utilizes two waste streams including flue gas from power plants and other suitable sources and reject brine from desalination plants and other suitable sources for mineralization process to produce carbonates (e.g., $CaCO_3$, $MgCO_3$, $Na_2CO_3$, $BaCO_3$, the like, and suitable combinations thereof). The process treats both flue gas and reject brine in the same process to produce commercially-valuable products (i.e., carbonates). The process also includes a step of regenerating amine.

Figure 1:
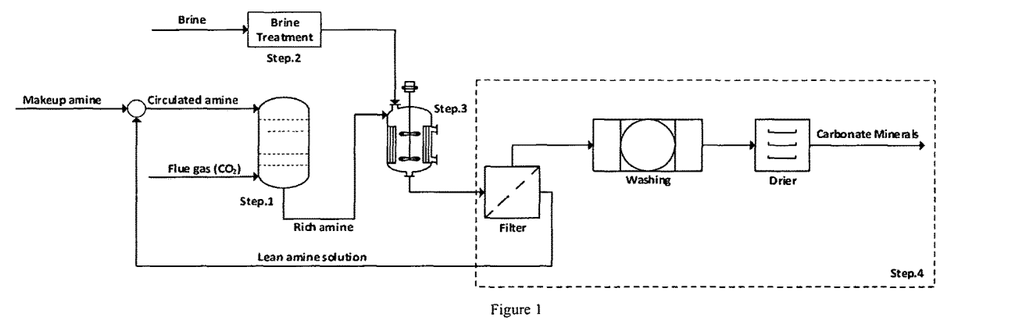
FIG. 1 shows a Novel Absorption-Mineralization Process Flow Diagram.

The process—as illustrated in FIG. 1—includes the following steps according to an embodiment: during step (1), flue gas reacts with an amine solution to produce carbamate; a circulated amine solution along with a makeup amine (e.g., to make up any amine loss during the whole process) enters to react with flue gas; and the resulting rich amine solution is directed to a reactor to regenerate amine and to produce carbonates. During step (2), reject brine is treated to make ready the brine (i.e., salt source stream) for carbonation reaction. During step (3), the rich amine solution (i.e., carbamate) reacts with salt from the brine to produce carbonates and regenerates the rich amine solution; this step ends with precipitation of carbonates from the liquid phase. During step (4), the solid carbonates are separated from the amine solution; the solid carbonates are washed with amine solutions and dried to produce anhydride carbonates.

The process for hybrid carbon capture and mineralization can treat both flue gas (which is otherwise released to the environment) and reject brine (which is otherwise disposed to the environment), thus benefiting the environment in both ways. Further, both waste streams are utilized by the present process to produce commercially valuable products of carbonates, which are commonly used in concrete, cement and other suitable building blocks and applications.

The present process provides a number of advantages including, for example: 1) it provides an economical process for CO2 capture, sequestration and utilization; 2) it is scalable and it can be designed to fit small-, mid- or large-scale plants; 3) it can be adaptable to any suitable gas stream and/or any suitable brine source stream; 4) a variety of different and suitable amine solutions may be used in the process; 4) it can be easily adapted to any suitable current or new co-generation plant; 5) it can work with any suitable alkaline waste streams; 6) it can work for any suitable CO2 source stream; 7) it can work for any suitable brine source stream.

The present process provides a number of desirable features related to CO2 capture, for example: 1) it chemically regenerates the rich amine solution to provide a lean amine solution to the process; 2) it does not require any thermal energy for amine regeneration; 3) it does not require a stripper column in CO2 capture process; 4) it does not require an anti-corrosion of CO2 capture plant; 5) it works well at nearly room temperature; and 6) it does not require an external alkaline source.

Further, the present process for hybrid carbon capture and mineralization is economically favorable as the starting materials are two waste streams and the end products do not need further treatment with a lifelong market demand.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

EXAMPLES

The following non-limiting examples are experimental examples supporting one or more embodiments provided by the present disclosure.

Example 1. Reaction for Ca-, Mg- and Ba-salts

Figure 2:
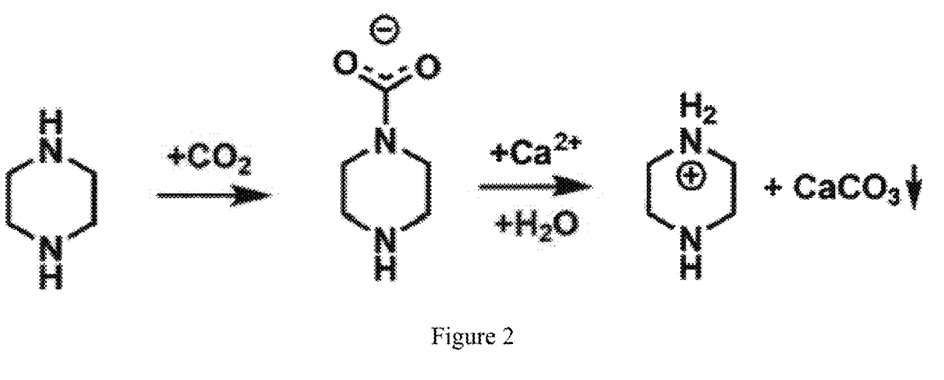
FIG. 2 shows a Group #2 Reaction Mechanism.

FIG. 2 shows examples of Group #2 Reaction Mechanism.

In a two-neck round bottom flask, 10 g of piperazine was added to 80 g of deionized water under continuous stirring, at room temperature. Upon complete dissolution of the amine, the pH, measured by pH-meter, was raised to 11-12. $CO_2$ gas (purity 4N) was purged via rubber septum into the solution with a pressure of 1 bar and continuous stirring (600 rpm). The pH gradually dropped between 7-6. After approximately 15 minutes, the pH became stable and 10 g of CaCl$_2$) (or MgCb, or BaCb) was added to the mixture.

Immediately, the solution turned from clear to milky and a white fine precipitate started crushing out. After 30 minutes from the addition of the salt, the purging of CO$_2$ was stopped. The solution was filtered under vacuum. The filtrate was washed with deionized water and left to dry in the oven overnight. The resulting white solid, with yields ranging from 20 to 90%, was characterized by FT-IR, SEM, XRD, and EDS. All the used characterization techniques confirmed the formation of carbonate.

Example 2. Reaction for Na-Salts (Group #1)

In a two-neck round bottom flask, 10 g of piperazine was added to 80 g of deionized water under continuous stirring at room temperature. Upon complete dissolution of the amine, the pH, measured by pH-meter, raised to 11-12. CO$_2$ gas (purity 4N) was purged via rubber septum into the solution with a pressure of 1 bar and continuous stirring (600 rpm). The pH gradually dropped between 7-6. After approximately 15 minutes, the pH became stable and 80 g of acetone was added to the mixture. Once the two liquids mixed completely, 10 g of NaCl was added.

Slowly, the solution turned from clear to milky and a white fine precipitate started crushing out. After 3 minutes from the addition of the salt, the purging of CO$_2$ was stopped. The solution was filtered under vacuum. The filtrate was washed with acetone and left to dry in the oven overnight. The resulting white solid was characterized by FT-IR, SEM, XRD, and EDS. All the used characterization techniques confirmed the formation of carbonate.

Example 3. Regeneration Reaction

Figure 3:
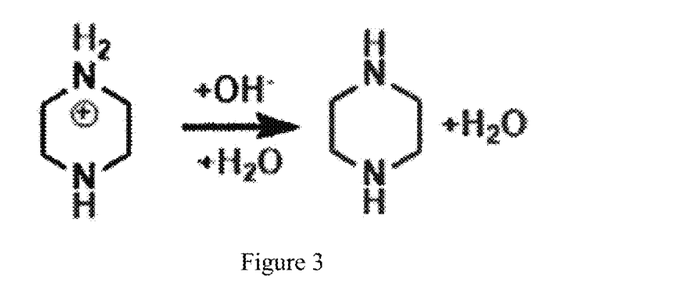
FIG. 3 shows Rich Amine Regeneration Mechanism.

FIG. 3 shows an example of a Rich Amine Regeneration Mechanism.

Figure 4:
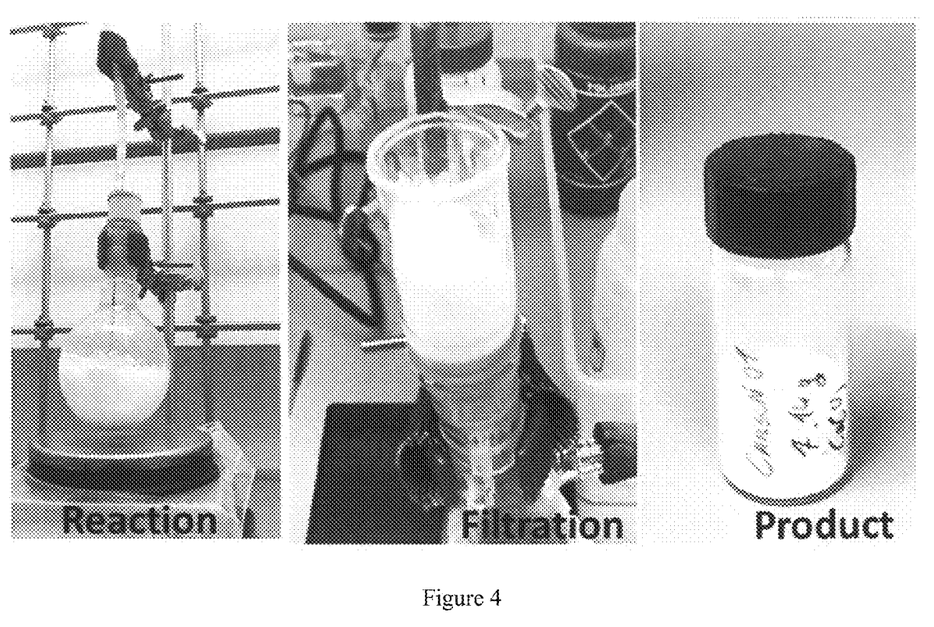
FIG. 4 shows Carbon Capture, Sequestration and Utilization Reaction Experimental Steps.

FIG. 4 shows an example of Carbon Capture, Sequestration and Utilization Reaction Experimental Steps.

The spent solution obtained from the aforementioned reaction was added to a two-neck round bottom flask under continuous stirring. The initial pH was in the range of 5-6. The pH was adjusted up to a value of 11 with the addition of conc NaOH solution. In another embodiment, a makeup amine also can be used. At this point, CO$_2$ gas (purity 4N) was purged via rubber septum into the solution with pressure of 1 bar and continuous stirring. The pH gradually dropped between 7-6.

Slowly, the solution turned from clear to milky and a white fine precipitate started crushing out. After 30 minute the purging of CO$_2$ was stopped. The solution was filtered under vacuum. The filtrate was washed with deionized water and left to dry in the oven overnight. The resulting white solid was characterized by FT-IR, SEM, and EDS. All the used characterization techniques confirmed the formation of carbonate arising from the unreacted salt already present in the spent solution.

TABLE 1

Summary of tested salts, regenerated amine, and product yield.

| Brine Feed | Yield % | Product | Product (gm) | Regenerated Amine Solution (gm) |
|---|---|---|---|---|
| CaCl$_2$ | 93.25 | CaCO$_3$ | 8.41 | 87.93 |
| MgCl$_2$ | 31.62 | MgCO$_3$ | 2.8 | 89.43 |

TABLE 1-continued

Summary of tested salts, regenerated amine, and product yield.

| Brine Feed | Yield % | Product | Product (gm) | Regenerated Amine Solution (gm) |
|---|---|---|---|---|
| BaCl$_2$ | 69.34 | BaCO$_3$ | 7.92 | 82.84 |
| NaCl | 22.88 | Na$_2$CO$_3$ | 4.15 | — |

Example 4. Product Characterization of CaCO$_3$

Figure 5:
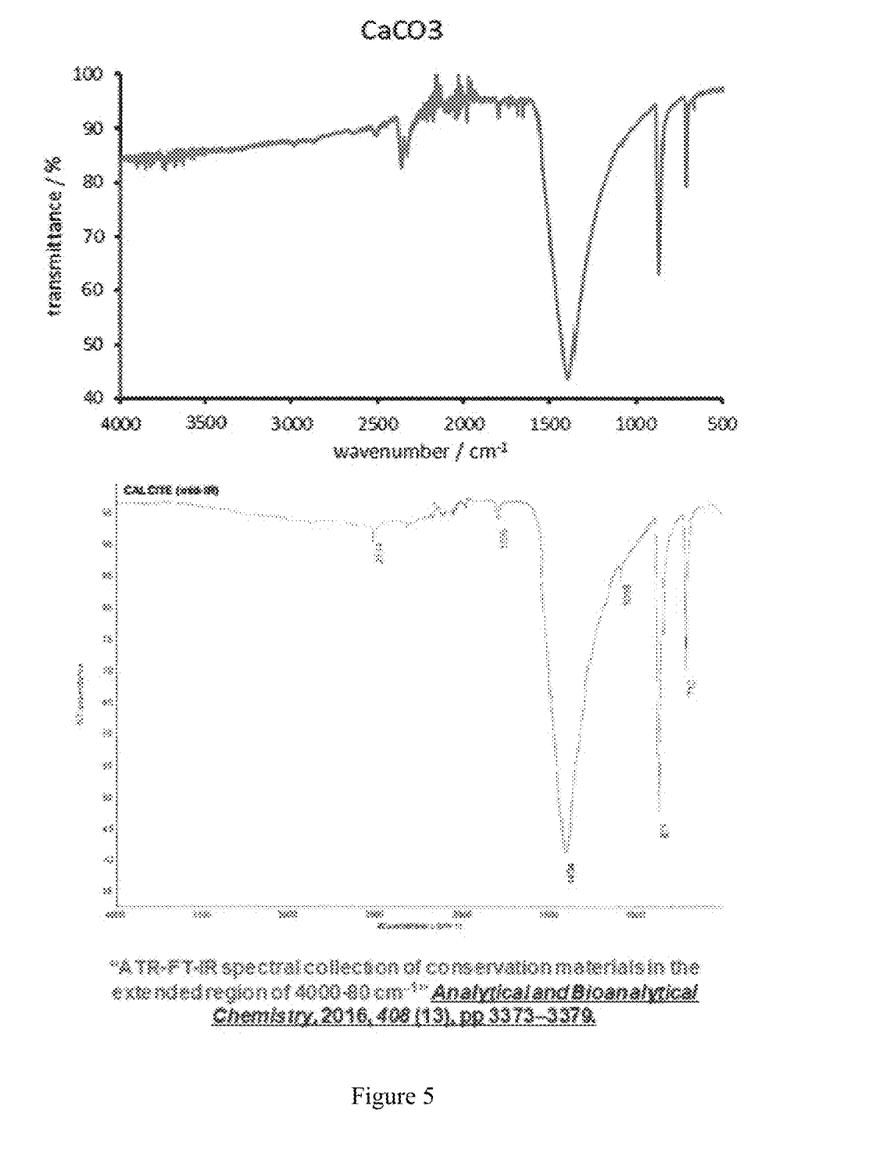
FIG. 5 shows FT-IR spectra of $CaCO_3$.

FIG. 5 (top figure) shows FT-IR for the experimentally produced CaCO$_3$ and (bottom figure) FT-IR from the literature reference for comparison.

Figure 6:
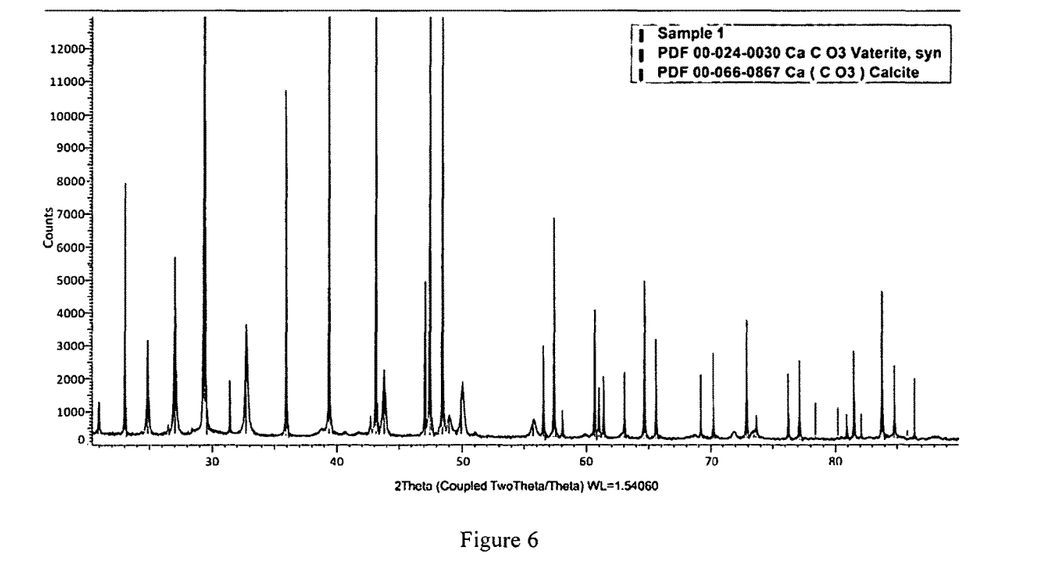
FIG. 6 shows XRD spectra of $CaCO^3$.

FIG. 6 shows the XRD for the experimentally produced CaCO$_3$.

The isolated solids have been preliminary characterized by Attenuated total reflection (ATR) FT-IR and X-ray powder diffraction (XRD).

The FT-IR spectrum for CaCO$_3$ matches with the literature, revealing a mineral morphology like calcite. The XRD analysis confirmed the presence of calcite and valerite (see FIGS. 5 and 6).

Example 5. Product Characterization of BaCO$_3$

Figure 7:
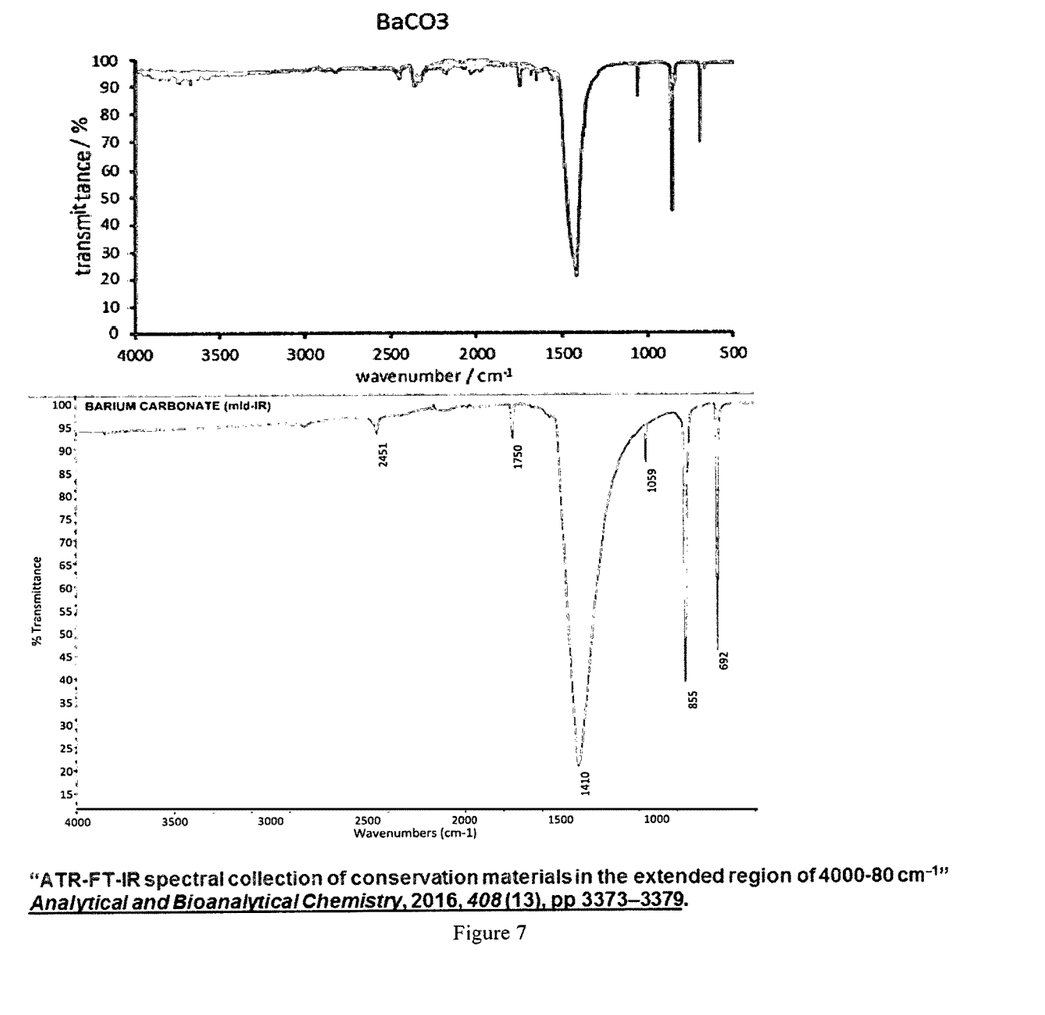
FIG. 7 shows FT-IR spectra of $BaCO_3$.

FIG. 7 (top figure) shows FT-IR for the experimentally produced BaO$_3$ and (bottom figure) FT-IR from the literature reference for comparison.

Figure 8:
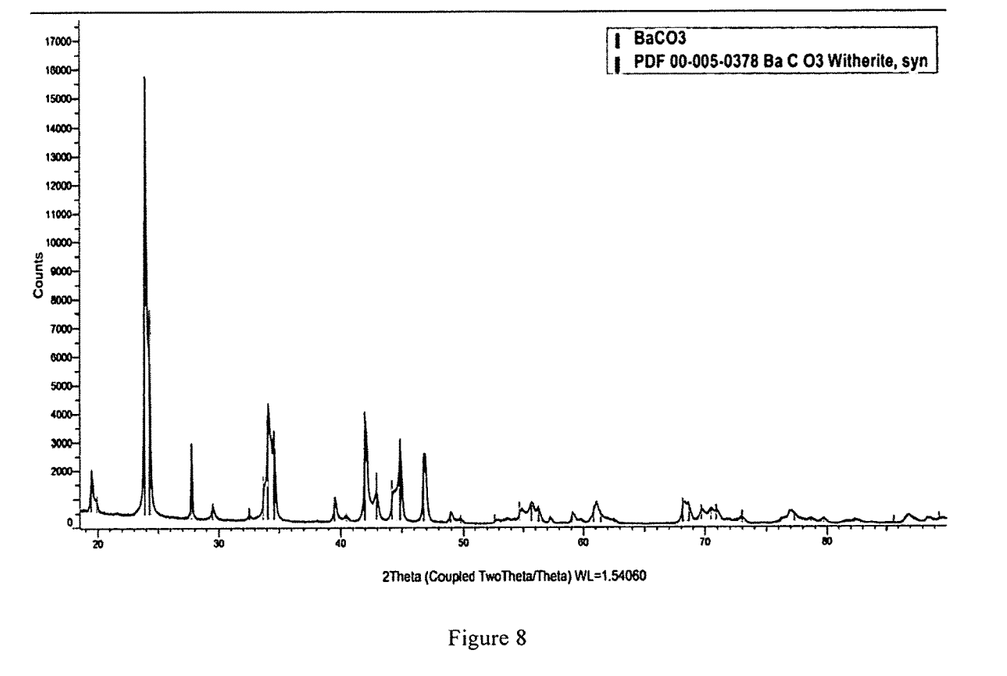
FIG. 8 shows XRD spectra of $BaCO_3$.

FIG. 8 shows the XRD for the experimentally produced BaCO$_3$.

The FT-IR spectrum for BaCO$_3$ matches with the literature. The XRD analysis confirmed the presence of BaCO$_3$ as whiterite (See FIGS. 7 and 8).

Example 6. Product Characterization of MgCO$_3$

Figure 9:
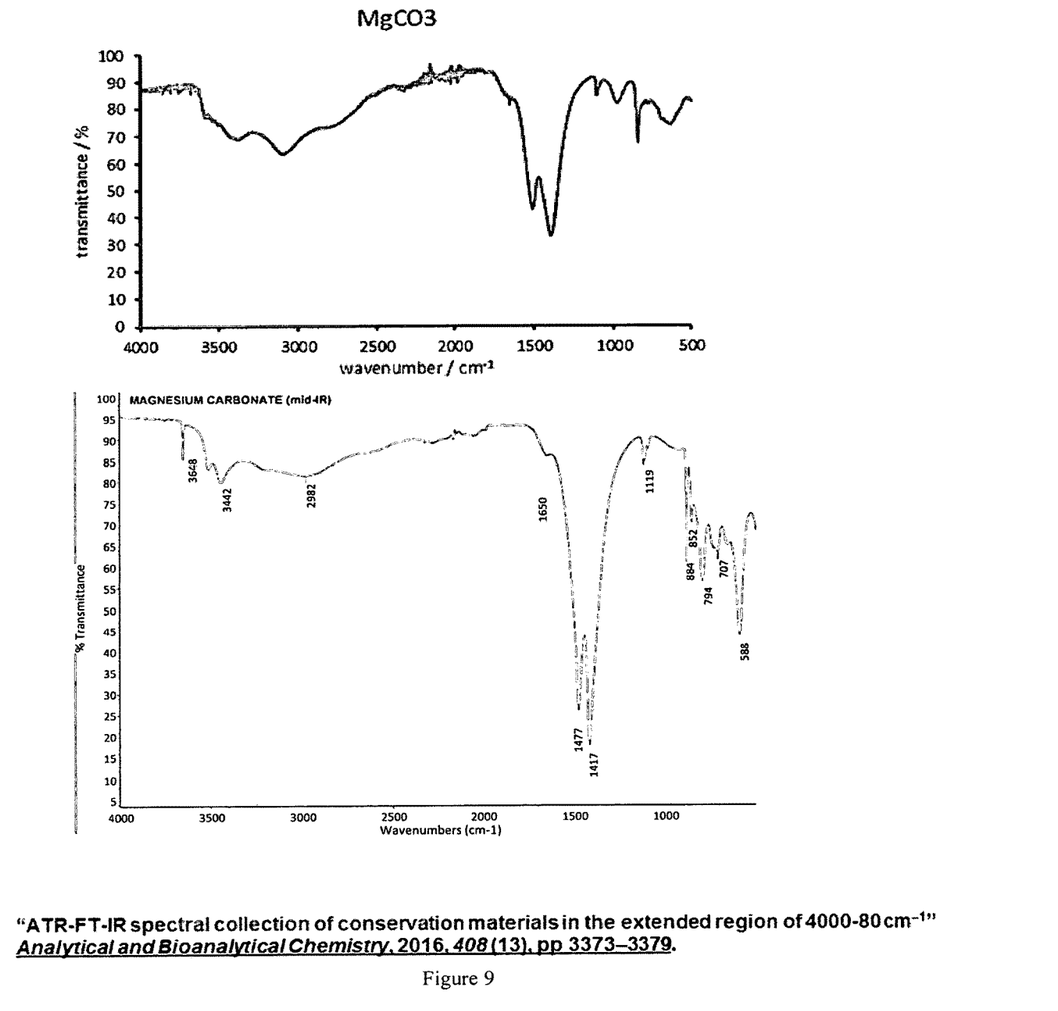
FIG. 9 shows FT-IR spectra of $MgCO_3$.

FIG. 9 (top figure) shows FT-IR for the experimentally produced MgCO$_3$ and (bottom figure) shows the FT-IR from the literature reference for comparison.

The FT-IR spectrum for MgCO$_3$ matches with the literature. The XRD analysis did not match with any known morphology for MgCO$_3$, however, the Energy-dispersive X-ray spectroscopy (SED) confirmed the presence of hydrated MgCO$_3$.

Example 7. Product Characterization of Na$_2$CO$_3$

Figure 10:
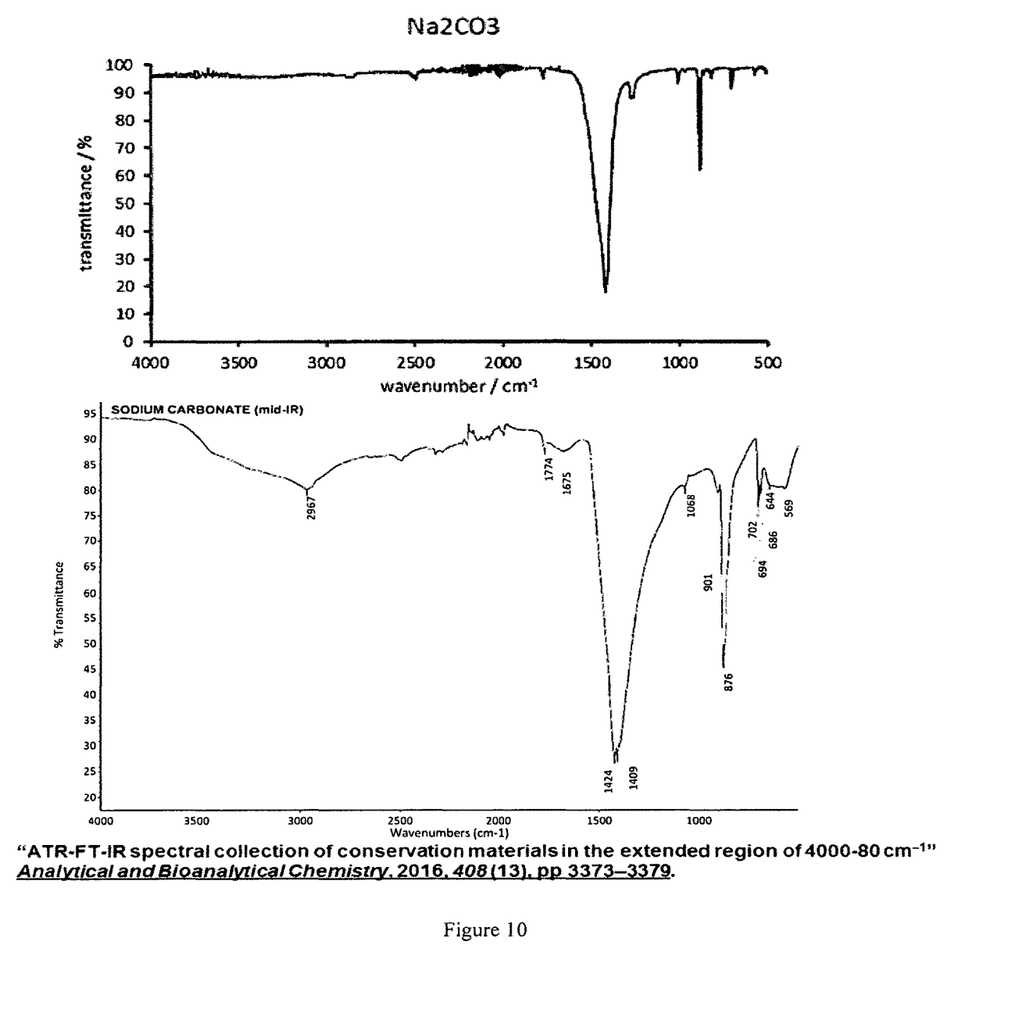
FIG. 10 shows FT-IR spectra of $Na_2CO_3$.

FIG. 10 (top figure) FT-IR for the experimentally produced Na$_2$CO$_3$ and (bottom figure) shows FT-IR from the literature reference for comparison.

Figure 11:
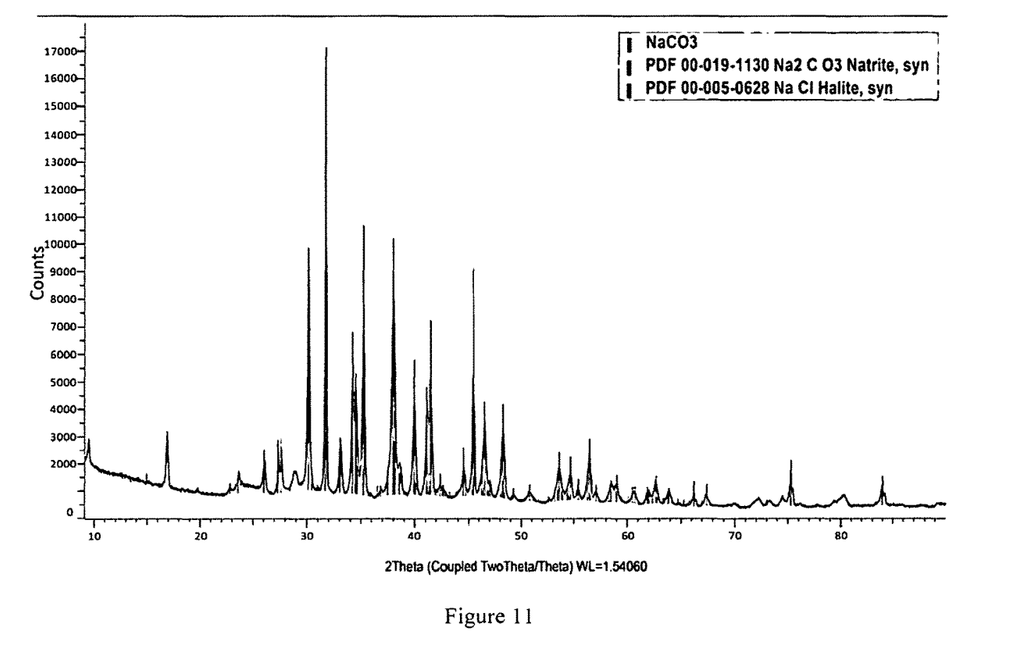
FIG. 11 shows XRD spectra of $Na_2CO_3$.

FIG. 11 shows the XRD for the experimentally produced Na$_2$CO$_3$.

The FT-IR spectrum for Na$_2$CO$_3$ matches with the literature (FIG. 10). The XRD analysis confirmed the presence of Na$_2$CO$_3$, as natrite, together with the presence of NaCl, that can be removed by further washing the sample with water: acetone mix (FIG. 11).

Example 8. Proof of Concept

Regarding outputs, the solid product is Carbonate, not bicarbonate or other product, as characterized by the XRD analysis as well as FT-IR, EDS and SEM. The FT-IR analysis is compared with literature and confirmed carbonate formation.

The reaction yield is the amount of product obtained in a chemical reaction. For benchmark comparison, one can compare against the conventional/standard process:

$$Na_2CO_{3(aq)} + Ca^{2+} \text{ or } Mg^{2+} + CaCO_3 \text{ or } MgCO_3$$

TABLE 2

Yield comparison

| Product | Benchmark Yield from conventional recess | Yield from Novel Process |
|---|---|---|
| CaCO$_3$ | Average of 90% Calera Process | 93.25% |

Example 9. Scale-Up

The proof of concept was conducted on a lab scale (100 ml reactor volume). Increasing the scale of such a process requires will require additional and gradual scaling up of the reactor volume, while increasing the maturity of the process as reflected in the below Table 3.

TABLE 3

Scale-Up Criteria

| Scale | Reactor Volume | Location | Timeline |
|---|---|---|---|
| Small | 100 ml–1000 ml | ROG-Applied Chemistry Lab | By 2020 |
| Mid | 5000 ml | RDC- Applied Chemistry Lab | By 2022 |
| Large | 1000 L | To be decided | To be decided |

For each level of scale, different parameters are be checked and optimized for scale adaptions including: reaction conditions (temperature, pressure, and rotation speed); reactant ratios; amine type and concentration; regenerated amine solution activity; filtration, washing and drying time and type; product yield, stability and quality; detailed techno-economics study (payback, ROI, NPV, breakthrough point, etc.); and frequent updates to the products market need and value.

The versatile process for hybrid carbon capture and mineralization is an economical process for CO2 capture, sequestration, and utilization; scale-adapted and can be designed to fit small, mid and large-scale plants; can be adapted for different gas stream; can be adapted for any brine source stream; succeed using many amine solvents; can be easily adapted to a current and new co-generation plant, where $CO_2$ source is available from (flue gas) and reject brine stream is coming from desalination plants; and can succeed in alkaline waste streams.

The invention is claimed as follows:

1. A process for hybrid carbon capture and mineralization, the process comprising:
   providing flue gas to react with an amine solution to produce carbamate;
   processing the carbamate to regenerate amine and to produce carbonates;
   treating reject brine to provide ready-made brine for carbonation reaction;
   processing the carbamate with salt from treating reject brine to produce a carbonate;
   precipitation of a solid carbonate from a liquid phase;
   separating the solid carbonate from the amine solution; and
   washing the solid carbonate and drying the washed solid carbonate to produce the carbonate.

2. The process of claim 1 further comprising providing a makeup amine to make up any amine loss during the process.

3. The process of claim 1, wherein the carbonate comprises an alkaline-earth metal of Group #2 (Ca, Mg, Ba, Be, Sr, and Ra) and a carbonate ion.

4. The process of claim 3, wherein the carbonate is at least one of $CaCO_3$, $MgCO_3$, $Na_2CO_3$, and $BaCO_3$.

5. The process of claim 1, wherein the carbonate comprises an alkali metal of Group #1 (Li, Na, K, Rb, Cs, and Fr) and a carbonate ion, and
   wherein of an entrainer is added.

6. The process of claim 5, wherein the entrainer is from an organic family including one of acetone, ethanol, methanol, and isopropanol.

7. The process of claim 1, wherein the carbonate comprises a transition metal (Pb, Fe, Cu, and Cd) and a carbonate ion.

8. A process for hybrid carbon capture and mineralization, the process comprising:
   providing flue gas to react with an amine solution to produce carbamate;
   processing the carbamate to regenerate amine and to produce carbonates;
   treating reject brine to provide ready-made brine for carbonation reaction; and
   processing the carbamate with salt from treating reject brine to produce a carbonate,
   wherein the carbonate comprises an alkali metal of Group #1 (Li, Na, K, Rb, Cs, and Fr) and a carbonate ion, and
   wherein an entrainer is added.

9. The process of claim 8, wherein the entrainer is from an organic family including one of acetone, ethanol, methanol, and isopropanol.

* * * * *